United States Patent
Deppe et al.

(10) Patent No.: US 7,887,196 B2
(45) Date of Patent: Feb. 15, 2011

(54) PROJECTION SYSTEM AND METHOD FOR OPERATING A PROJECTION SYSTEM TO COMPENSATE FOR OVERSHOOT SEQUENCE

(75) Inventors: Carsten Deppe, Aachen (DE); Tom Munters, Hasselt (DE); Christofher Daniel Charles Hooijer, Helmond (NL); Hans Feijen, Eindhoven (NL); Sander Habets, Berghem (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 655 days.

(21) Appl. No.: 11/912,343

(22) PCT Filed: Apr. 21, 2006

(86) PCT No.: PCT/IB2006/051240
§ 371 (c)(1), (2), (4) Date: Oct. 23, 2007

(87) PCT Pub. No.: WO2006/114742
PCT Pub. Date: Oct. 2, 2006

(65) Prior Publication Data
US 2008/0273179 A1 Nov. 6, 2008

(30) Foreign Application Priority Data
Apr. 28, 2005 (EP) .................................. 05103512

(51) Int. Cl.
*G03B 21/20* (2006.01)
*H05B 37/02* (2006.01)

(52) U.S. Cl. ..................................... 353/85; 315/209 R

(58) Field of Classification Search .................. 353/85; 315/209 R, 224, 225, 246, 294
See application file for complete search history.

(56) References Cited

U.S. PATENT DOCUMENTS

| | | | |
|---|---|---|---|
| 5,608,294 A | 3/1997 | Derra et al. | |
| 5,706,061 A | 1/1998 | Marshall et al. | |
| 6,236,167 B1 | 5/2001 | Yamaguchi et al. | |
| 6,791,285 B2 * | 9/2004 | Greenwood et al. | 315/307 |
| 2004/0125113 A1 | 7/2004 | Kempf et al. | |
| 2005/0151937 A1 * | 7/2005 | Sugitani | 353/85 |

FOREIGN PATENT DOCUMENTS

| | | |
|---|---|---|
| EP | 1018723 A2 | 7/2000 |
| EP | 1154652 A2 | 11/2001 |
| EP | 1176853 A1 | 1/2002 |
| EP | 1263266 A1 | 12/2002 |
| JP | 2000250464 A1 | 9/2000 |
| JP | 2003272881 A * | 9/2003 |

* cited by examiner

*Primary Examiner*—Thanh X Luu

(57) ABSTRACT

A method for operating a projection system (1) is described, wherein a brightness level (B1, B2, B3, B4, B5, B6) in an image (IM) is represented by the total length of a number of light switch-on phases within a particular image cycle (VT). A high pressure discharge lamp (2) of the projection system (1) is operated via a lamp driver with an essentially square-wave alternating current (IL) SO that an overshoot sequence (0), which occurs in the alternating current (IL) after a current zero crossing during operation of the high pressure discharge lamp (2), has a frequency so high that for each possible brightness level at least one full period (P) of the overshoot sequence (0) lies essentially within a light switch-on or switch-off phase (ts) following the zero crossing. A projection system (1) and a lamp driver (10) for a high pressure discharge lamp (2) in such a projection system (1) are also described.

7 Claims, 3 Drawing Sheets

Figure 1:
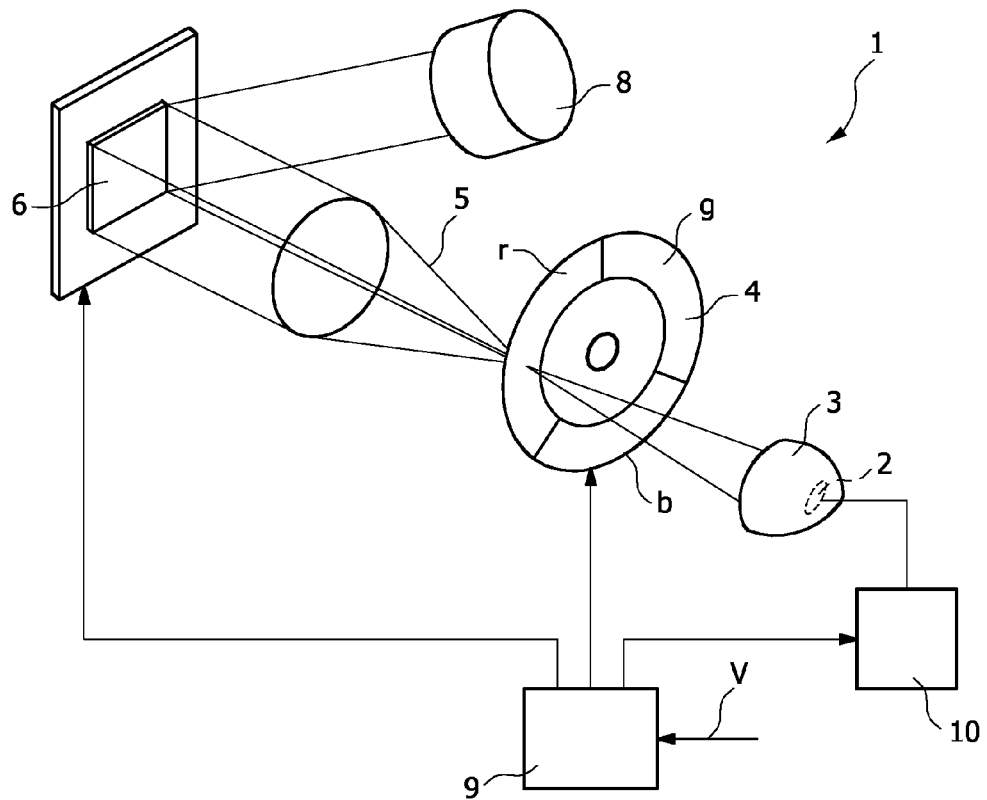

PROJECTION SYSTEM AND METHOD FOR OPERATING A PROJECTION SYSTEM TO COMPENSATE FOR OVERSHOOT SEQUENCE

The invention relates to a projection system having a high pressure discharge lamp, preferably a high performance discharge lamp, for example a UHP (ultra-high performance) lamp, and a display device with a control device which switches the display device in a time-modulated fashion so that a brightness level in an image is represented by the total length of a number of light switch-on phases within a particular image cycle. The invention also relates to a method for operating a projection system, and to a lamp driver for a high pressure discharge lamp in such a projection system.

A typical example of such a projection system is the so-called DLP® system (DLP=digital light processing) from Texas Instruments®. The key component of this system is a display device in the form of a chip, on which a number of minute mobile mirrors is applied as individual display elements—one mirror per image point to be represented. These mirrors are exposed to the light from the high pressure discharge lamp. Depending on whether an image point on the projection surface, i.e. in the image to be represented, is intended to appear bright or dark, the associated mirror is tilted so that the light is reflected toward the projection surface or away from it to an absorber. The individual mirrors of this "mirror array" consequently form a network with which arbitrary image patterns can be generated and, for example, video images can be reproduced. Since the light at an image point of the projection surface can only be turned on or off in such a system by tilting the associated mirror—and defined attenuation of the light cannot be achieved, for example as in LCD (Liquid Crystal Display) systems—the various brightness levels in the image (or gray levels in a monochrome image) are represented in the way mentioned in the introduction by means of a pulse width modulation method (also known as a "time sequential" method). Within a particular image cycle, each display element of the display device is driven so that, overall, light strikes the relevant image point of the projection surface over a particular time fraction of the image cycle, and not in the remaining time fraction. Owing to the inertia of the eye relative to the image cycle frequency, the amount of light is integrated in an observer's eye over an image cycle, so that the relevant image point appears brighter or darker. If the light is turned off fully during an image cycle, i.e. a light switch-off phase occupies the entire image cycle then the relevant image point appears black. If the light is turned on over the entire length of the image cycle, however, then the relevant pixel has the highest brightness level. Since the brightness in such systems is controlled via the time sequential switching, i.e. the length and number of the light switch-on and switch-off phases within an image cycle, it is necessary that the light intensity to which the display is exposed should be as constant as possible not only spatially but also temporally. This is because if the light intensity were to change within an image cycle, then the brightness level would be determined not only by the total length of the light switch-on phases and light switch-off phases but also by the chronological position of the individual light switch-on phases within the image cycle.

For illuminating the display element, it is consequently necessary to have a light source which as far as possible emits a constant luminous power (a constant light flux), i.e. always the same amount of light. It is now conventional to use high pressure discharge lamps as lamps in such projection systems, preferably high intensity discharge lamps (HID lamps). In order to ensure uniform wear of the two electrodes and therefore a sufficient service life of the lamp, these lamps are operated with a low-frequency square-wave alternating current so that the current direction between the electrodes switches over constantly. The lamp is in this case generally driven by a special lamp driver, which converts the DC current provided by a DC voltage source into the square-wave alternating current required for the lamp with the appropriate pulse shape. One disadvantage of this method is that unless particular measures are implemented, the abrupt switchover of the current direction in conventional drivers necessarily leads to an overshoot sequence in the operating current of the lamp after the zero crossing. This overshoot sequence is also referred to as ringing. The overshoot sequence in the operating current of the lamp naturally needs to a corresponding overshoot in the luminous power emitted by the high pressure discharge lamp. On the other hand—as mentioned above—it is necessary for the lamp to have a constant luminous power. In order to resolve this problem, it would in principle be possible to use suitable synchronization in order to ensure that the overshoot sequence lies outside an image cycle. In many projection systems, for example, the color representation is likewise carried out time-sequentially. To this end, three monochrome images are generated in succession—a red image, a green image and a blue image. The inertia of the eye then ensures that the image appears colored. To this end, for instance, a color filter is arranged between the lamp and the display device, usually in the form of a so-called color wheel which alternates the color at a particular frequency. In the transition times from one color to another—referred to as spokes in analogy with the spokes of a wheel—the color is undefined. These spoke times are therefore inherently unusable for the normal image representation in the image, and are either blocked out or used to reinforce the brightness of the display with a reduced quality. The square-wave alternating current could therefore in principle be synchronized with the driving of the color filter so that the overshoot sequence always lies within such a spoke time. On the other hand, as described in U.S. Pat. No. 5,608,294, for the stability of the arc discharge and the durability of the electrodes of a high pressure discharge lamp it is advantageous that a current pulse, which temporarily increases the operating current before the zero crossing, should be superimposed on the operating current as close as possible before a current zero crossing. Such a stabilization pulse is also generally referred to as an anti-flatter pulse. Such an anti-flatter pulse of course also leads to corresponding light fluctuations in the lamp. So that such an advantageous operating method can also be used in the time-sequentially operating projection systems mentioned in the introduction, EP 1 154 652 A2 proposes that the lamp driver and the controlling of the color filter should be synchronized so that this anti-flatter pulse lies within a spoke time and cannot lead to disturbance of the brightness levels in the image. Since the anti-flatter pulse lies immediately before the zero crossing of the current and the overshoot sequence lies immediately after the zero crossing, these regions directly follow each other inside the time profile of the current. Unfortunately, however, the spoke time is generally at best long enough for the anti-flatter pulse to be accommodated in this time span. The overshoot sequence therefore necessarily comes after a spoke time, i.e. at the start of an image cycle. In principle, it would admittedly be possible to extend the spoke time artificially by appropriate driving of the display. This solution, however, leads to a great loss of light which degrades the overall image quality.

Conventionally, this problem is therefore countered by designing the driving of the display elements so that the system reacts as insensitively as possible to the overshoot sequence. For example, the individual switch-on or switch-off times within an image cycle may be selected so that as long as possible a switch-off phase lies directly at the start of an image cycle and the overshoot sequence is therefore substantially blocked out. Although this avoids the effect of the overshoot sequence on the brightness value representation, nevertheless there are then still very stringent requirements on the driver in order to suppress the visible influences of the overshoot sequence.

It is an object of the present invention to refine a method for operating a projection system, and a projection system, of the type mentioned in the introduction so that the influence on the representation of the brightness levels in the image due to the overshoot sequence, which occurs in the operating current of the high pressure discharge lamp after a current zero crossing, is reduced as far as possible in a straightforward and cost-effective way.

This object is achieved, on the one hand, by a method as claimed in claim 1.

According to the invention, the high pressure discharge lamp of the projection system is operated via a lamp driver with an essentially square-wave (low-frequency) alternating current so that the overshoot sequence, which occurs in the alternating current after a current zero crossing has a frequency so high that for each possible brightness level at least one full period of the overshoot sequence lies essentially within a light switch-on or switch-off phase following the zero crossing. To resolve the problem, an attempt is not made—as would otherwise be customary—to minimize the amplitude of the overshoot or even entirely avoid the overshoot sequence, but instead the frequency is simply increased so that the effects of the overshoot sequence are avoided because at least one full period lies within a switch-on or switch-off phase following the zero crossing. This effect can be further enhanced by suitable time positioning or length selection of the individual light switch-on and switch-off phases. In a plurality of test runs, it has been found that a frequency increase according to the invention can achieve a significant improvement in the brightness level representation, and that above particular frequencies absolutely no effect of the overshoot sequence on the brightness level representation can be discerned by the observer. The requirements of the lamp driver with respect to the amplitude of the overshoots can therefore be relaxed.

The term an "essentially square-wave alternating current" in the context of this invention moreover generally means an alternating current with a current profile which—apart from customary tolerances and current pulses deliberately superimposed for particular effects—has a substantially constant profile over time and a sufficiently fast polarity change. That is to say besides a customarily used square-wave alternating current, this also includes for example a trapezoidal alternating current or the like, the edges of which are steep enough for use in a corresponding projection system. The current pulses deliberately superimposed for particular effects may, for example, be the aforementioned anti-flatter pulse or in particular square-wave pulses which, for example, extend over the length of a particular color segment in order to increase the intensity of this color compared to other colors.

The object is furthermore achieved by a projection system as claimed in claim 7.

Besides a high pressure discharge lamp and a conventional display device with a control device, which switches the display device in a time-modulated fashion so that a brightness level in an image is represented by the total length of a number of light switch-on phases within a particular image cycle, such a projection system according to the invention requires above all a lamp driver which is designed such that the high pressure discharge lamp of the projection system is operated with an essentially square-wave alternating current so that the overshoot sequence, which occurs in the alternating current after a current zero crossing during operation of the high pressure discharge lamp, has a frequency so high that for each possible brightness level at least one full period of the overshoot sequence lies essentially within a light switch-on or switch-off phase following the zero crossing.

Preferably, the frequency should be so high that if possible a multiplicity of full periods of the overshoot sequence lies within a switch-on or switch-off phase. In principle, however, in the extreme case it is sufficient for such averaging out of the effect of the overshoot sequence that one full period should lie within such a switch-on or switch-off phase.

The dependent claims respectively contain particularly advantageous configurations and refinements of the invention.

In a plurality of tests, it has been found that relatively good results are achieved if the frequency of the overshoot sequence is greater than or equal to 7.5 kHz, so that it is preferable to ensure that the frequency reaches this value. Particularly preferably, a frequency which is greater than or equal to 9.5 kHz should be reached, since the effect of the overshoot sequence can no longer be discerned by the observer above this frequency in the systems tested so far.

In the aforementioned projection systems, a brightness level in the image is conventionally represented digitally by a sequence of bits with different values within an image cycle. The bits are respectively defined by the length of a light switching phase in the relevant image cycle. In principle, the bits may also be decomposed into a plurality of switching sub-phases. In order to ensure that for each possible brightness level, i.e. even with the lowest brightness, the effect of the overshoot sequence is minimal irrespective of how the sequence of individual bits—i.e. their individual switching phases—is arranged or distributed within an image cycle, the frequency in a more particularly preferred embodiment should be selected so that at least one full period of the overshoot sequence lies essentially within the switching phase of a least significant bit (conventionally called LSB).

Besides voltage source terminals for connecting a DC voltage source and lamp terminals for connecting the high pressure discharge lamp, a particularly preferred lamp driver constructed according to the invention for a high pressure discharge lamp in a projection system according to the invention has a circuit arrangement which converts a direct current tapped from the DC voltage source into an essentially square-wave alternating current for the high pressure discharge lamp with a frequency of between 40 Hz and 2 kHz, preferably between 45 and 150 Hz. The circuit arrangement is in this case designed so that an overshoot sequence, which occurs in the alternating current after a current zero crossing during operation of the high pressure discharge lamp, has a frequency greater than or equal to 7.5 kHz, preferably greater than or equal to 9.5 kHz.

If the circuit arrangement has a switching converter which sets the amplitude of the operating current of the high pressure discharge lamp, i.e. it imposes the current profile, and a commutator circuit which commutates the current direction, then essentially the inductances in the commutator circuit and capacitances in the switching converter are preferably dimensioned so that the frequency of the overshoot sequence corresponds to the aforementioned values. When dimensioning the inductances inside the commutator circuit, the inductance of the lamp itself should also be taken into account so that the inductances acting in the commutator circuit must be designed in accordance with the other components.

In the scope of the invention, not only is the frequency of overshoots occurring after a zero crossing increased but preferably also the frequency of the overshoots which may occur after other steep current changes, for example after the aforementioned current pulses deliberately superimposed on a "basic alternating current". This effect is advantageously achieved without additional outlay in the aforementioned configuration of the lamp driver.

These and other aspects of the invention are apparent from and will be elucidated with reference to the embodiments described hereinafter.

Figure 2:
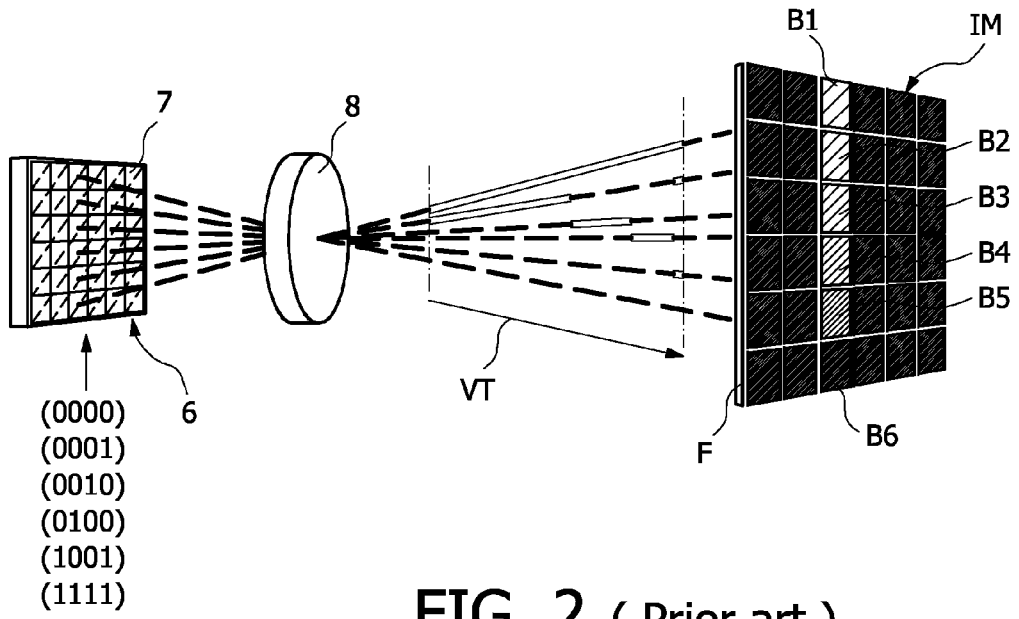
Figure 3:
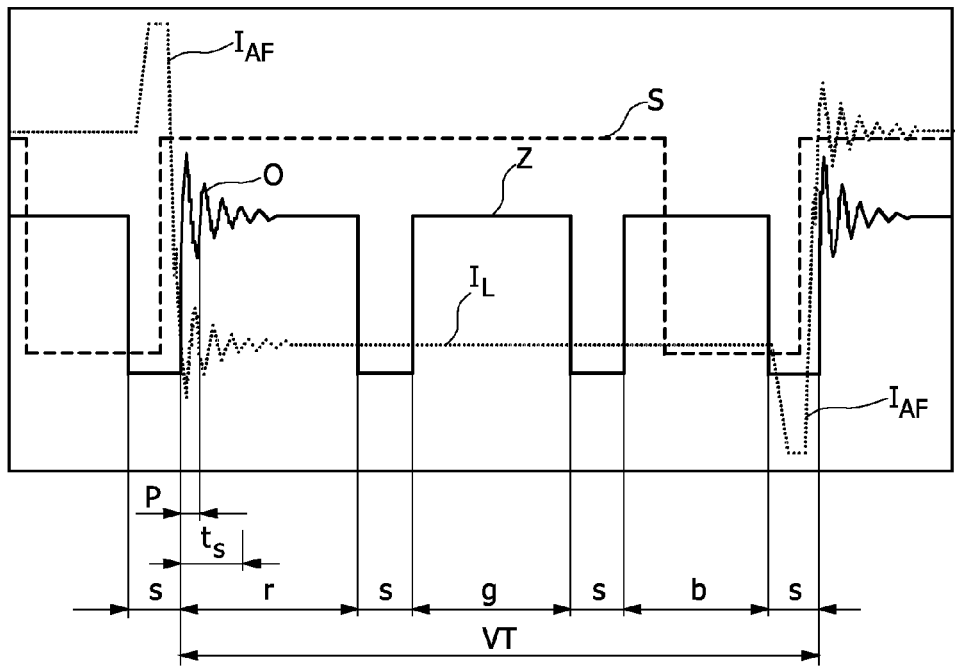
Figure 4:
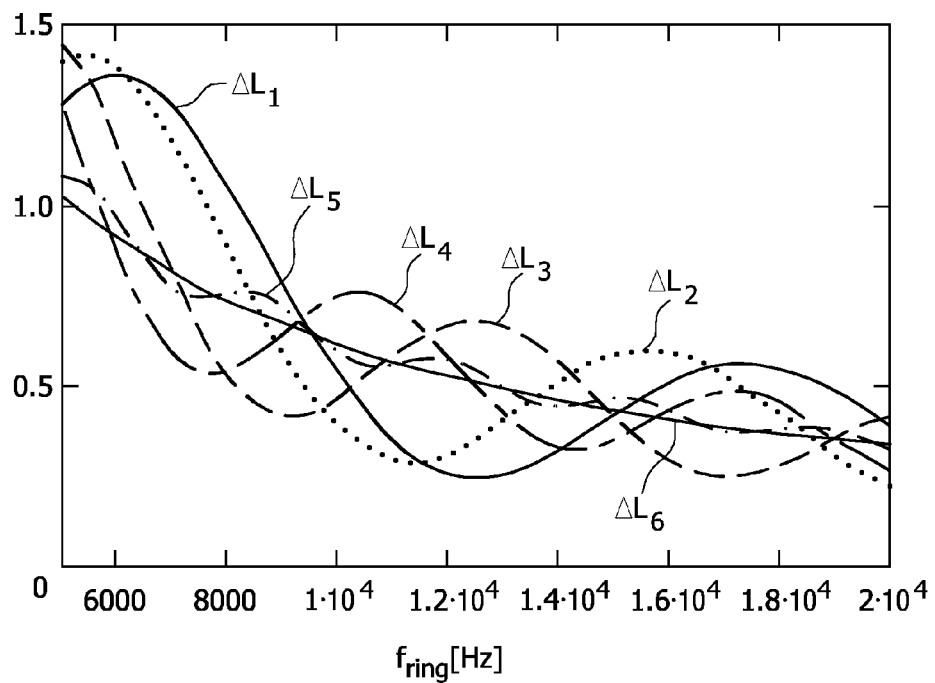
Figure 5:
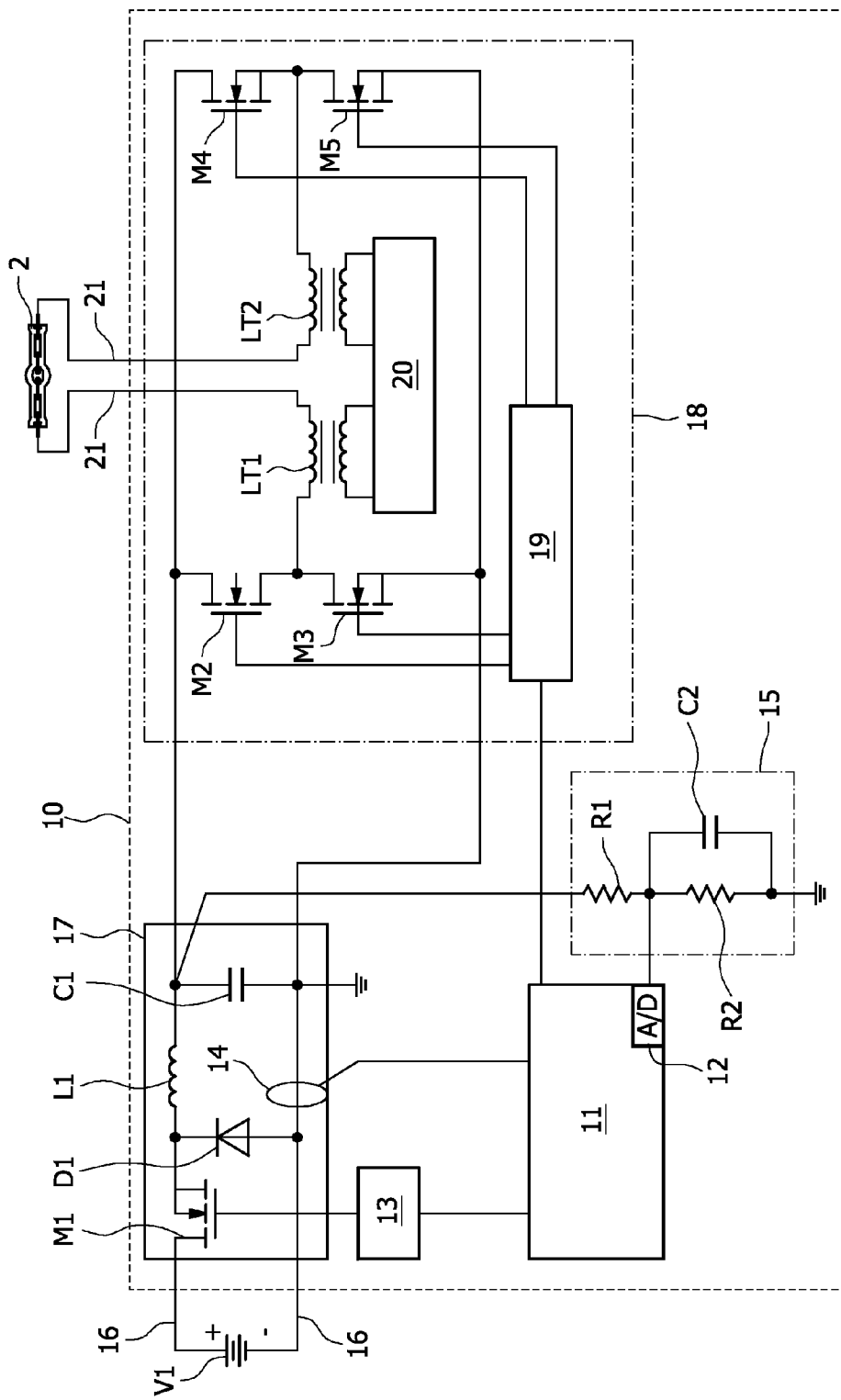

In the drawings:

FIG. 1 shows a schematic representation of an exemplary embodiment of a projection system, FIG. 2 shows a schematic representation to explain the time-sequential representation of brightness levels within an image, FIG. 3 shows a schematic representation of the lamp operating current, the resulting light flux and the synchronization clock for driving various components of the projection system, FIG. 4 shows a diagram which represents the relative error in the light flux against the frequency of the overshoot sequence for various switching times, FIG. 5 shows a basic circuit diagram of an exemplary embodiment of a lamp driver according to the invention.

FIG. 1 shows a typical DLP® projection system 1. This system has a high pressure discharge lamp, preferably a so-called UHP (ultra-high performance) lamp, arranged in a reflector 3. The lamp 2 is supplied with the required square-wave voltage by a driver 10. The light emitted by the lamp 2 is focused in the direction of a converging lens 5 by the reflector 3. In the beam path of the light, there is a color wheel 4 between the reflector 3 and the converging lens 5. The color wheel 4 is preferably positioned as accurately as possible at the focal point lying between the reflector 3 and the converging lens 5 so that the light spot on the color wheel 4 is as small as possible. The converging lens 5 ensures that a display device, here a so-called DMD (digital mirror device), located behind the converging lens 5 is illuminated as well as possible. As already mentioned in the introduction, such a DMD is a chip with a matrix of minute mirrors 7 as display elements 7, which can be tilted individually so that the mirrors 7 reflect the light either through a projection objective 8 onto a projection surface F (see FIG. 2) or, with an appropriately tilted mirror 7, onto an absorber surface (not shown).

The color wheel 4 here has three segments with the colors red r, green g and blue b. This color wheel 4 rotates one or more times about its own axis within an image cycle VT, so as to successively generate a monochrome blue image, a monochrome red image and a monochrome green image which combine to form a color image owing to the inertia of the observer's eye. Instead of a color wheel with three segments, it is of course also possible to use other color wheels, for example color wheels with four segments (a red segment, a green segment, a blue segment and a white segment) or with six segments, in which two green, two red and two blue segments respectively lie opposite each other. The latter variant has the advantage that the color wheel only has to rotate with half the frequency. Alternatively, further different color segments may also be introduced, for example yellow, cyan, etc.

A control device 9 drives the display device 6 (also referred to below as the "display" for brevity), the color wheel 4 and the lamp driver 10 and thus ensures the synchronization, to be described in more detail below, of these components 6, 4, 10. As the input signal, for example, the control device 9 may receive a video signal V which contains video data that are to be represented by the projection system 1. It is clear that the control device 9 may also consist of a plurality of control sub-devices. For example, a separate control device may also be provided in order to drive the display elements 7 of the display 6, and this may in particular also be arranged on a circuit board with the DMD chip. It is likewise possible for the complete control device to be integrated in one component, for example with the DMD chip, and to send the synchronization commands for the other components from there. It is furthermore possible for the other components, such as the color wheel or lamp driver, to have their own control devices which in turn transmit synchronization commands to the other components. What is essential in the end is merely that the components are synchronized with one another in the required way so that the intended image is generated on the projection surface F.

FIG. 2 shows a graphical representation to explain how different brightness levels $B_1$, $B_2$, $B_3$, $B_4$, $B_5$, $B_6$ can be represented in the image IM by time-modulated switching of the individual mirrors 7. A DMD chip with 6×6 individual mirrors 7 is represented here by way of example. By the projection objective 8, the light rays reflected by the individual mirrors 7 are represented as image pixels within the image IM on the projection surface F. For the sake of clarity, in this example only six different brightness levels $B_1$, $B_2$, $B_3$, $B_4$, $B_5$, $B_6$ are shown in one of the two central columns of the matricial image IM.

The time profile within an image cycle VT is represented between the projection objective 8 and the projection surface F. The example represented is based on a simplified version in which 16 different brightness levels can be represented digitally with the aid of four bits. Technically, this is done by respectively defining the bits by the total length of a particular light switching phase in the relevant image cycle VT, i.e. the value of a bit depends on how long the light strikes the respective image pixel on the projection surface F during an image cycle VT, i.e. is switched on. Examples of bit sequences, which may be set from top to bottom for the individual mirrors 7 in the central column of the DMD chip 6, are shown below the DMD chip 6 (in FIG. 2). The top mirror is accordingly driven in an image cycle VT so that the corresponding image pixel has the lowest brightness level $B_6$. This mirror is accordingly driven with the value 0, which corresponds in binary to the number [0000]. The mirror lying below is intended to represent the next brightness level up $B_5$, and is therefore driven with the binary number [0001]. That is to say this mirror is switched so that the light shines only during a time span which corresponds to the least significant bit, and is otherwise switched off. When there are 16 levels in all, this time span corresponds to one $16^{th}$ of the total image cycle VT, which is correspondingly represented in FIG. 2. The third mirror down is intended to represent the next brightness level up and therefore receives the binary value [0010], to which end this mirror is switched on for a time period of one $8^{th}$ of the image cycle VT and switched off for the rest of the time. In this way, 16 brightness levels can be arbitrarily represented digitally, with the mirror reflecting the light onto the relevant pixel on the projection plane throughout the image cycle VT in the case of the highest brightness level $B_1$. This is represented in FIG. 2 for the bottom mirror and the associated top image pixel in the relevant column of the image IM.

If a signal is now to be represented by discrete digital values in this way, then the resolution is set by the number of possible levels. The standard for modern projection systems is an 8 bit representation. This corresponds to 256 brightness levels in all. In general, it is necessary for the light flux to be so constant that the accuracy of the representation is at least better than or equal to the lowest brightness levels. If errors greater than the lowest representable level occur in the representation, there may sometimes no longer be constant function. This means that a value which should actually be minimally brighter is darker because of possible errors in the consistency of the light flux. Such errors are unfortunately particularly perceptible in images since they lead to stripes in slow color profiles.

An estimate will be given below for the maximum permissible relative error in the consistency of the light flux which would still be allowed without leading to visible errors in the image. For the sake of simplicity, the average light flux which the lamp emits over time is set as 100% for this. The switch-on time of a bit is conventionally indicated in µs. The amount of light within a bit consequently has the unit µs %.

As mentioned above, the accuracy of the representation must be at least better than or equal to the lowest representable level. Assuming a conventional image rate of 60 Hz—three color images being represented successively within an image cycle—and the conventional 8 bit representation (256 levels), then the switch-on time of the least significant bit is $$t_{LSB} = 1/(60 \cdot 3 \cdot 256) = 21.7\ \mu s \tag{1}$$

With a constant light flux of 100%, this corresponds to an amount of light of 2,170 µs %.

All interference which could be caused by errors in the light flux should consequently be less than 2,170 µs %. If an overshoot sequence with a duration of 200 µs occurs in the light flux, then this must on average have an amplitude of at most 2,170 µs % ÷ 200 µs = 10.85% of the average amplitude of the light flux.

In this regard, FIG. 3 shows a schematic representation of the curve profiles of the various parameters within the projection system against time during an image cycle VT.

The curve S shows the profile of the synchronization signal, which is used to synchronize the lamp driver 10, the color wheel 4 and the display 6 with one another.

The curve $I_L$ shows the profile of the lamp current. A square-wave alternating current is employed here, the half-period of which corresponds to the length of an image cycle VT. This means that with an image frequency of 60 Hz, for example, the square-wave alternating current of the lamp driver 10 has a frequency of 30 Hz. The lamp driver 10 shapes the current so that a current pulse $I_{AF}$, the so-called anti-flatter pulse, is set immediately before switchover of the current direction. As explained in the introduction, this ensures that the arc discharges remain as stable as possible and the durability of the electrodes is extended. The undesired overshoot sequence O then occurs immediately after the zero crossing.

The curve Z shows the profile of the light intensity on the projection surface F (assuming that the light has not in the meantime been tilted away with the aid of the mirror).

Light fluctuations due to the overshoot sequence O in the current profile can be seen clearly in the light flux profile Z. This means that the overshoot sequence also occurs almost unchanged in the light flux profile Z. At the start and end, as well as at two positions during the image cycle VT, the light flux profile Z furthermore shows the spoke times s in which the light is blocked during the color change. The various color phases red r, green g and blue b lie between spoke times s.

As the profiles of the curves S, Z, $I_L$ show, the lamp driver 10 and the color wheel 4 are synchronized so that the anti-flatter pulse $I_{AF}$ in the current profile $I_L$ coincides exactly with a spoke time S. This, however, means that the overshoot sequence O following the anti-flatter pulse $I_{AF}$ lies after the zero crossing inside the image cycle VT. According to the calculations above, it is therefore necessary to ensure that the error generated by the overshoot sequence O is as small as possible. This is done according to the invention by increasing the frequency of the overshoot sequence O to such an extent that at least one full period P lies within a coherent switch-on or switch-off phase $t_S$ of the display following the zero crossing, as indicated in FIG. 3.

Here, it should be borne in mind that appropriate positioning of the individual bits within the image cycle VT can of course ensure that the coherent switch-on or switch-off phase $t_S$ at the start of an image cycle, i.e. in the region where the overshoot sequence occurs, is relatively long. The largest representable bit, which has a length of 2,560 µs with a mirror switching time of 20 µs as currently used in general, may for example always be set at the start of an image cycle VT. Conventionally, however, the switch-on time of the larger bits as well is further divided into smaller switching phases, since excessively long switch-on times can make flickering occur in moving images or if the eyes are moved over the image. The duration of the individual switch-on and switch-off phases is therefore usually of the order of 100 to 1,000 µs in practice, with small switching phases preferably being used.

The light flux profile L(t) during the overshoot sequence can be mathematically described as follows:

$$L(t) := 1 + A_{ring} \cdot e^{-\left(\frac{t}{\tau_{ring}}\right)} \cdot \sin\left(2 \cdot \pi \cdot f_{ring} \cdot t - \frac{\pi}{6}\right) \tag{2}$$

Here, $f_{ring}$ is the frequency, $A_{ring}$ is the amplitude and $\tau_{ring}$ is the time constant of the decay of the overshoot sequence.

The deviation in the light flux ΔL can therefore be calculated as a function of the frequency $f_{ring}$ of the overshoot sequence and according to the length of the switching phase $t_S$ placed after the zero crossing:

$$\Delta L(t_S, f_{ring}) := \left[\left[\int_0^{t_S}\left[\begin{array}{c}1 + A_{ring} \cdot e^{-\left(\frac{t}{\tau_{ring}}\right)} \cdot \\ \sin\left(2 \cdot \pi \cdot f_{ring} \cdot t - \frac{\pi}{6}\right)\end{array}\right] dt\right] - t_S\right] \cdot 10^6 \cdot \frac{100}{L_{LSB}} \tag{3}$$

$L_{LSB}$ is in this case the length of the least significant bit. The function is normalized without units to 1 by the term $10^6 \cdot 100 / L_{LSB}$.

The function given by Equation (3) for the deviation ΔL is represented in FIG. 4 as a function of the frequency $f_{ring}$ of the overshoot sequence for various switching times TS. The length of the least significant bit is in this case set to $L_{LSB} = 10$ µs, which corresponds to the desired standard for a newer generation of mirror arrays with higher switching times of 10 µs. The amount of light of the least significant bit would then be 1,000 µs % according to the above calculations for Equation (1). The curves in FIG. 4 respectively represent the error against the frequency of the overshoot sequence for switching times $t_S$ of between 90 µs and 700 µs, with the function corresponding to ΔL₁: $t_S$=90 µs,
ΔL₂: $t_S$=100 µs,
ΔL₃: $t_S$=125 µs,
ΔL₄: $t_S$=150 µs,
ΔL₅: $t_S$=300 µs,
ΔL₆: $t_S$=700 µs.

The curves in FIG. 4 are of course also dependent on the amplitude of the overshoot sequence. A relatively high value was assumed to calculate the curves in FIG. 4, for which the amplitude of the overshoot frequency may be up to 40% of the average "normal" current amplitude (instead of the values <10% currently adhered to). The allowed error is less than 1. The curves clearly show that with a switching time $t_S$ of 100 µs, the error falls below 1 for a frequency above about 7,800 Hz. With the frequency of about 5,000 Hz which is currently conventional for the overshoot sequence, however, the error is above 1 for all switching times. This clearly shows that increasing the frequency $f_{ring}$ of the overshoot frequency can lead to a significant reduction of the error in the light flux. For the realistic conditions represented in FIG. 4, which already take into account a reduced switching time of 10 µs for the least significant bit, increasing to above 7.8 kHz is sufficient to compensate for the error in the light flux generated after commutation by the overshoot sequence with a relatively small switching time $t_S$ of 100 µs.

FIG. 5 shows a lamp driver 10 through which a corresponding current profile can be achieved with a sufficiently high frequency of the overshoot sequence in a straightforward way by suitable dimensioning of various components. The lamp 2 is connected to this driver 10 via suitable lamp terminals 21.

This lamp driver 10 is connected to a DC voltage supply V1 via voltage supply terminals 16. The external DC supply voltage is for example 380 V. On the input side, the driver 10 has a switching converter 17 which is responsible for imposing the intended lamp current. This switching converter 17 is formed by a switch M1, a diode D1, an inductance L1 and a capacitance C1, for example a capacitor. A control device 11 controls the switch M1, and therefore the current in the lamp 2, via a level shifter 13. Depending on the embodiment, the current may also be monitored by the control device 11 using an inductive measuring element 14. For the voltage measurement, a correspondingly reduced voltage is tapped from the capacitor C1 via a voltage divider 15, consisting of two resistors R1 and R2, and is measured in the control device 11 by means of an analog-digital converter 12. The capacitor C2 is used merely to reduce interference in the measurement signal.

The correspondingly pre-shaped current is then transmitted to a commutator circuit 18 that comprises a commutator driver 19, which switches four switches M2, M3, M4, M5 in the manner of a bridge circuit and thus correspondingly switches over the current to the lamp 2.

For ignition, the lamp 2 is furthermore coupled to an ignition transformer 20. This ignition transformer 20 is conventionally fitted symmetrically to both terminals 21 of the lamp 2, as shown here. The ignition transformer 20 provides up to 20 kV for igniting the lamp 2. The inductances LT1, LT2 of the ignition transformer 20 also act to smooth the current during further operation of the lamp 2.

By corresponding model calculations, it can be established that the frequency $f_{ring}$ of the overshoot sequence after the zero crossing is primarily influenced by the sum L of the lamp inductance, the ignition transformer inductance(s) LT1, LT2 and any further series inductances present in the commutator circuit 18, on the one hand, and by the filter capacitor C1 in the switching converter 17 on the other hand. To a relatively good approximation, the frequency can then be described as follows:

$$f_{ring} = \frac{1}{2\pi\sqrt{L*C1}} \quad (4)$$

The inductance $L_{lamp}$ of the lamp 2 is usually itself about 300 µH. Ignition transformers are currently used in conventional lamp drivers, so that the inductance L in the commutator circuit 18 is about 500 µH. As a rule, a capacitance C1 of 1 µF has previously been used in the switching converter. According to Equation (4), this gives 5,627 Hz for the frequency of the overshoot sequence occurring in the lamp drivers which are currently conventional.

If a capacitance C1 of 0.5 µF is instead used in the switching converter 17, then the frequency of the overshoot sequence can easily be increased to $f_{ring}$=7,958 Hz. If suitable selection of the ignition transformers is furthermore used to ensure that the inductance L in the commutator circuit 18 is halved, then a frequency $f_{ring}$=9,597 Hz is in fact reached. This shows that even in previous driver technology, the desired frequency increases into a frequency range of more than 7,500 Hz, preferably 9,500 Hz, are already possible with straightforward measures and the image quality can be improved significantly.

To conclude, it should again be pointed out that the systems and methods represented in the figures and the description are merely exemplary embodiments which can be varied to a wide extent by the person skilled in the art, without departing from the scope of the invention. For the sake of completeness, it will also be pointed out that the use of the indefinite article "a" or "an" does not exclude the possibility that there may also be several of the relevant features.

The invention claimed is:

1. A method for operating a projection system,
   wherein a brightness level in an image is represented by the total length of a number of light switch-on phases within a particular image cycle,
   wherein a high pressure discharge lamp of the projection system is operated via a lamp driver with an essentially square-wave alternating current so that an overshoot sequence, which occurs in the alternating current after a current zero crossing during operation of the high pressure discharge lamp, has a frequency so high that for each possible brightness level at least one full period of the overshoot sequence lies essentially within a light switch-on or switch-off phase following the zero crossing; and
   wherein the brightness level is represented digitally by a sequence of bits with different values within an image cycle, the bits respectively being defined by the length of a light switch-on phase in the relevant image cycle, and the high pressure discharge lamp being operated so that the frequency of the overshoot sequence is so high that at least one full period of the overshoot sequence lies essentially within the switching phase of a least significant bit.

2. A method as claimed in claim 1, wherein the high pressure discharge lamp is operated so that the frequency of the overshoot sequence is greater than or equal to 7.5 kHz.

3. A method as claimed in claim 2, wherein the high pressure discharge lamp is operated so that the frequency of the overshoot sequence is greater than or equal to 9.5 kHz.

4. A method as claimed in claim 1, wherein a current pulse having the same polarity as an operating current is superimposed on the operating current before a current zero crossing.

5. A method as claimed in claim 4, wherein the projection system comprises a color filter time sequential color representation, which alternates between different colors during an image cycle, and the color change is synchronized with the alternating current so that the current pulse occurs within a time span required for a color change.

6. A projection system, comprising
a high pressure discharge lamp,
a display device with a control device which switches the display device in a time-modulated fashion so that a brightness level in an image is represented by the total length of a number of light switch-on phases within a particular image cycle, and
a lamp driver which is designed such that the high pressure discharge lamp of the projection system is operated with an essentially square-wave alternating current so that an overshoot sequence, which occurs in the alternating current after a current zero crossing during operation of the high pressure discharge lamp, has a frequency so high that for each possible brightness level at least one full period of the overshoot sequence lies essentially within a light switch-on or switch-off phase following the zero crossing.

7. A lamp driver for a high pressure discharge lamp in a projection system, having voltage source terminals for connecting a DC voltage source, lamp terminals for connecting the high pressure discharge lamp, a circuit arrangement which converts a direct current tapped from the DC voltage source into an essentially square-wave alternating current for the high pressure discharge lamp with a frequency of between 40 Hz and 2 kHz, the circuit arrangement being designed so that an overshoot sequence, which occurs in the alternating current after a current zero crossing during operation of the high pressure discharge lamp, has a frequency greater than or equal to 7.5 kHz, wherein the circuit arrangement comprises a switching converter, which sets the amplitude of the operating current of the high pressure discharge lamp, and a commutator circuit, which commutates the current direction, wherein essentially inductances in the commutator circuit and capacitances in the switching converter are being dimensioned so that the frequency of the overshoot sequence is greater than or equal to 7.5 kHz.

* * * * *